US005737476A

United States Patent [19]
Kim

[11] Patent Number: 5,737,476
[45] Date of Patent: Apr. 7, 1998

[54] AUTOMATIC EDITING METHOD AND APPARATUS OF A VIDEO SIGNAL

[75] Inventor: Kuie-sup Kim, Suwon, Rep. of Korea

[73] Assignee: Samsung Electronics Co., Ltd., Kyungki-do, Rep. of Korea

[21] Appl. No.: 584,272

[22] Filed: Jan. 11, 1996

[30] Foreign Application Priority Data

Jan. 12, 1995 [KR] Rep. of Korea ............. 1995-491

[51] Int. Cl.⁶ .................................................. H04N 5/93
[52] U.S. Cl. ............................. 386/52; 386/63; 386/64
[58] Field of Search ................................. 358/355, 311;
360/13, 14.1, 14.2, 14.3, 3, 72.3, 15; 386/4,
52, 55, 56, 57, 60, 61, 62; 369/83; 395/792;
364/192, 225.8; H04N 5/93, 5/76, 9/79

[56] References Cited

U.S. PATENT DOCUMENTS

| | | | |
|---|---|---|---|
| 4,210,939 | 7/1980 | Ninomiya et al. | 360/14 |
| 4,570,192 | 2/1986 | Hori | 360/14.2 |
| 4,618,895 | 10/1986 | Wright | 386/4 |
| 4,768,102 | 8/1988 | O'Gwynn | 358/311 |
| 4,819,087 | 4/1989 | Takeuchi et al. | 386/54 |
| 4,893,198 | 1/1990 | Little | 386/52 |
| 5,043,828 | 8/1991 | Sasho | 386/52 |
| 5,182,677 | 1/1993 | Kizu et al. | 360/14.2 |
| 5,331,474 | 7/1994 | Lee | 386/54 |
| 5,452,096 | 9/1995 | Ito | 358/311 |
| 5,481,411 | 1/1996 | Nakatani | 358/311 |
| 5,526,125 | 6/1996 | Mori et al. | 358/311 |

Primary Examiner—Thai Tran
Assistant Examiner—Aun S. Moe
Attorney, Agent, or Firm—Sughrue, Mion, Zinn, Macpeak & Seas, PLLC

[57] ABSTRACT

An automatic editing method of a video signal and apparatus, therefor which automatically erases unwanted scenes of video signals recorded on a source tape and performs an edit-recording operation. The automatic editing apparatus of video signals sets start and end positions of an erase interval using capstan frequency pulses, during a first reproduction of signals on the source tape. Next, the apparatus performs a recording operation on an editing tape during a second reproduction of signals on the source tape, so that the video signal at the preset interval is not recorded on the editing tape. Accordingly, the present invention has an effect that desirous scenes from the source tape are continuously edited. Particularly, since a camcorder and video cassette tape (VTR) 8 mm format has no control signal such as that of a VHS type, the present invention provides an improved editing method of the video signal using the capstan frequency pulses.

7 Claims, 3 Drawing Sheets

AUTOMATIC EDITING METHOD AND APPARATUS OF A VIDEO SIGNAL

BACKGROUND OF THE INVENTION

The present invention relates to a method and apparatus for automatically editing a video signal, and more particularly to an automatic editing method and apparatus of a video signal, which can set unnecessary scenes, reproducing a video signal prior to edit-recording, and automatically erase a preset scenes during edit-recording.

Generally, editing of pictures is required for erasing unwanted pictures and recording only those pictures which are needed after a set of pictures are photographed. For such an editing in conventional art, there has been used two image recording/reproducing apparatus such as a camcorder or video cassette recorder (VCR), which are connected with each other. One of these apparatus is used as a reproducer for reproducing a source tape and the other is employed as a recorder for recording desired scenes from the source tape on an editing tape. First, the reproducer is set in a play mode and the recorder is set in a record mode, respectively, and then a video signal of a source tape is recorded on an editing tape. When a scene to be erased appears, the recorder is in a pause mode, and when an erasing scene almost ends, the recorder is again in a record mode. Such a process is iterated until the overall video signal of the source tape is to be produced.

The conventional editing apparatus is inconvenient in that it requires a user to operate keys and to monitor two image devices at the same time, and to iterate again the above process from the portions where portions to be erased are omitted.

As other prior art, Japanese laid-open application No. 1993-236411 discloses a video signal editing apparatus. The editing apparatus of the laid-open application, which comprises a video analysis device, detects a luminance signal and an amount of parallel movement from reproduced signals, recognizes, as an unnecessary scene, a portion where the detected results are satisfied with a preset condition, and excludes this portion.

The editing apparatus of the conventional art has an advantage of automatically excluding a signal having a picture of bad quality, but still has a drawback not being capable of erasing unwanted scenes according to the user's purpose.

SUMMARY OF THE INVENTION

Therefore, to solve the above problem, it is an object of the present invention to provide an automatic editing method of a video signal which can preset unnecessary scenes, reproducing firstly a video signal prior to edit-recording, and thus automatically erase predetermined unwanted scenes during edit-recording.

Another object of the present invention is to provide an automatic editing apparatus of a video signal to embody the above method.

To accomplish one object of the present invention, there is provided an automatic editing apparatus of a video signal which records only desirous signals, among signals recorded on a source tape, on an editing tape, the automatic editing apparatus comprising:

detection means for detecting position data of a picture reproduced during reproducing the source tape; setting/ storing means for setting and storing an erase interval of the signals from a position value detected from the detection means through first reproduction of the source tape; control means for comparing position data detected from the detection means through second reproduction of the source tape with a storing value of the setting/storing means, and for outputting to recording means a specific signal at the preset signal erase interval; and recording means for recording signals reproduced from the source tape, and momentarily pausing a recoding operation when the specific signal is applied from the control means.

To achieve another object of the present invention, there is provided an automatic editing method of a video signal which records only desirous signals, among signals recorded on a source tape, on an editing tape, the automatic editing method comprising the steps of:

first reproducing signals recorded the source tape;

presetting a specific interval during first reproducing of the signals;

second reproducing signals recorded the source tape; and erasing signals corresponding to a specific interval which is preset during first reproduction from the second reproduction signals, and storing the remainder signals

BRIEF DESCRIPTION OF THE DRAWINGS

The present invention will be described in more detail with reference to the accompanying drawing in which.

DETAILED DESCRIPTION OF THE PREFERRED EMBODIMENT

Figure 1:
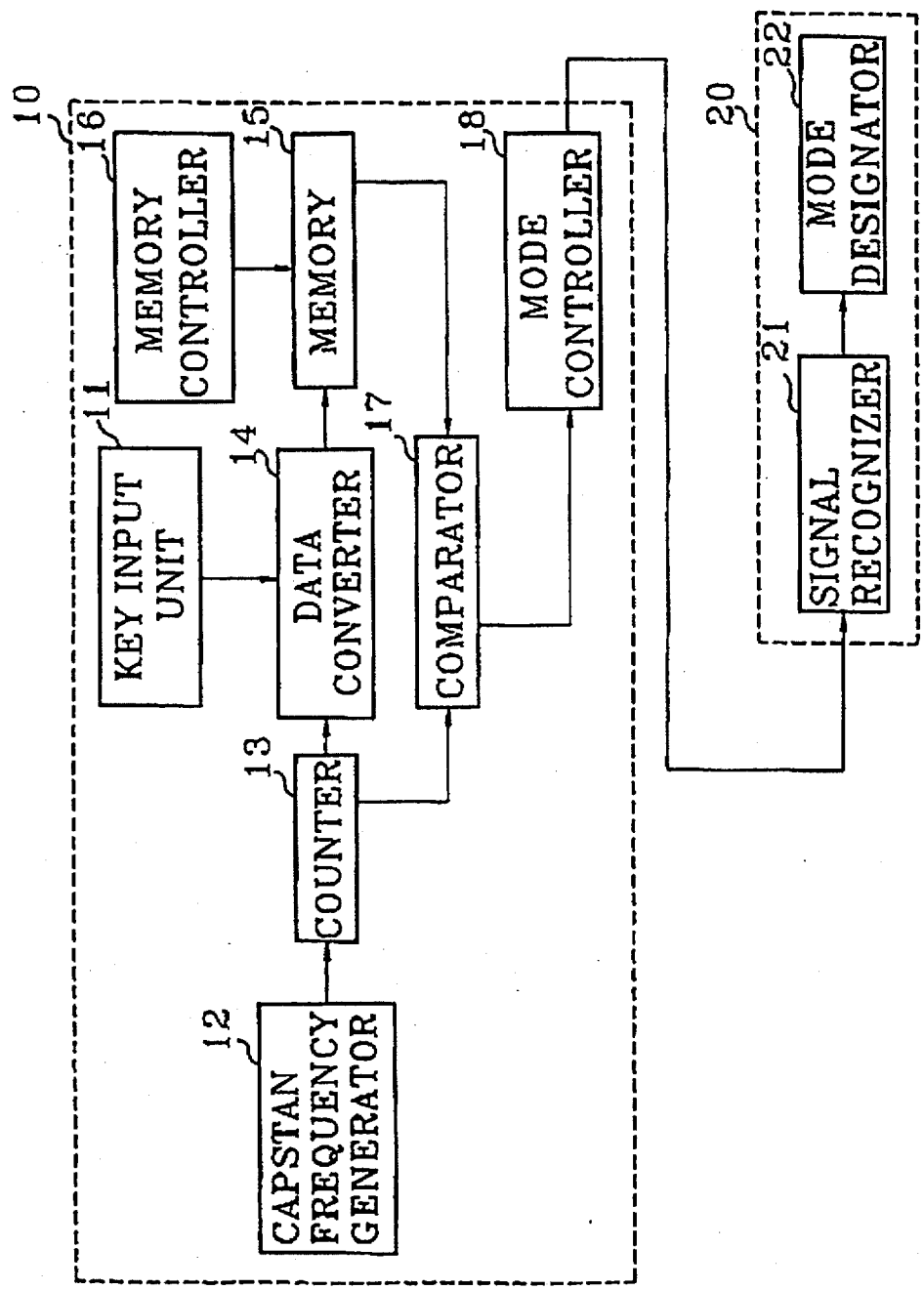
FIG. 1 is a block diagram for illustrating an automatic editing apparatus of a video signal in accordance with the present invention.

The apparatus of FIG. 1 comprises a reproducer 10 and a recorder 20. Reproducer 10 comprises a key input unit 11 having an editing start/end key and a designation key for an erase interval, and a capstan frequency generator 12 for generating a pulse signal proportional to the rotation of a capstan, to an output terminal which is coupled a counter 13 for counting an output signal of capstan frequency generator 12. To output terminals of key input unit 11 and counter 13 is connected a data converter 14 for combining output signals thereof. To output terminal of data converter 14 is connected a memory 15 for receiving and storing the output signal of data converter 14. Memory 15 is connected to a memory controller 16 for supplying a write/read control signal. To output terminals of counter 13 and memory 15 is connected a comparator 17 for comparing the output signal of counter 13 with that of memory 15. To output terminal of comparator 17 is coupled a mode controller 18 for controlling a mode state of recorder 20.

Furthermore, recorder 20 comprises a signal recognizer 21 for receiving and analyzing the output signal of mode controller 18 of reproducer 10, and a mode designator 22 for designating an operating mode of recorder 20 according to the output signal of signal recognizer 2.

Figure 2:
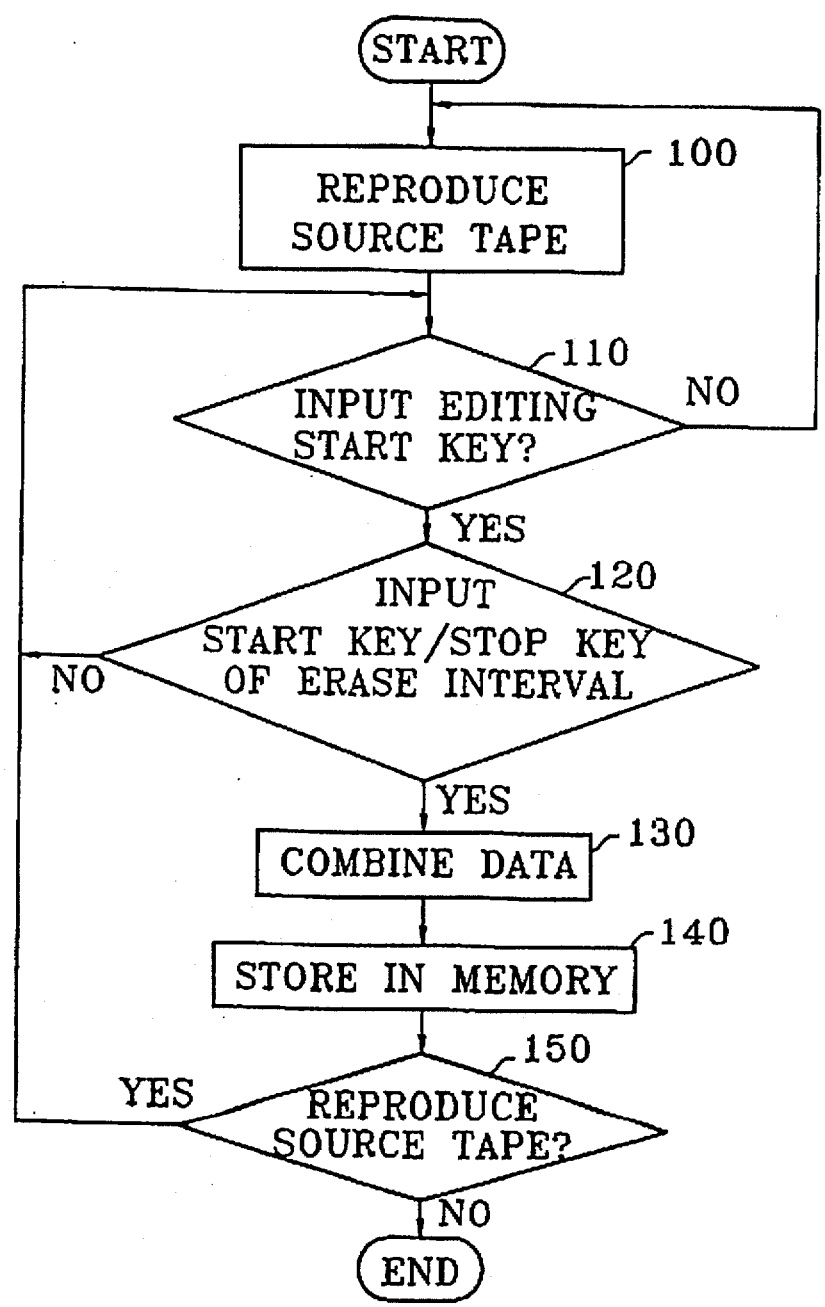
FIG. 2 is a flowchart performing the setting mode of an erase interval in FIG. 1 apparatus.
Figure 3:
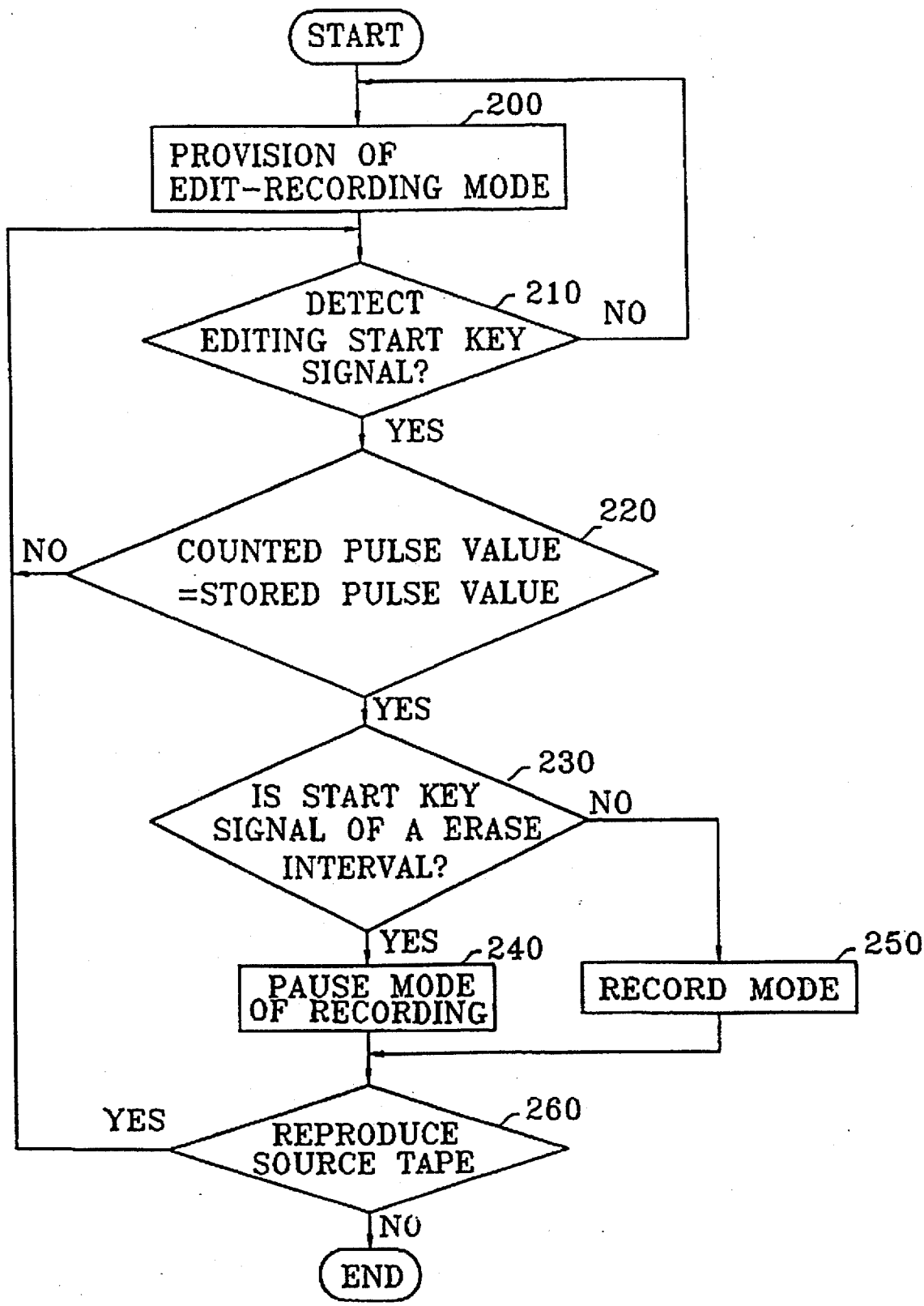
FIG. 3 is a flowchart performing an edit-recording mode the FIG. 1 apparatus.

An editing method using the FIG. 1 apparatus will be specifically described with reference to flow charts of FIGS. 2 and 3.

For the editing method of the present invention, reproducer 10 initially drives and reproduces a video signal recorded on a source tape (step 100). In step 110, a user inputs an editing start key signal via key input unit 11, monitors reproduction pictures, and searches an interval to be erased.

When reproduction with the source tape starts, counter 13 counts a pulse signal generated from capstan frequency generator 12 and supplies the counted value to data converter 14. When an interval to be erased is found by monitoring a play picture, the user inputs an erase start key signal via key input unit 11. If the erase start key signal is input in step 120, data converter 14 combines the erase start key signal and the pulse value applied from counter 13 and outputs the combined value to memory 15 in step 130. Memory 15 stores the combined signal of data converter 14 according to a write signal of memory controller 16 in step 140. When an end point of the erase interval is determined, the user inputs an erase stop key signal via key input unit 11. If an erase stop key signal is input in step 120, data converter 14 combines the erase stop key signal and a pulse value applied from counter 13 at that time and outputs the combined value to memory 15 in step 130. Memory 15 stores the combined signal of data converter 14 in step 140.

The above process is iterated till the end of the source tape, and the starts and ends of intervals to be erased are sequentially recorded in memory 15.

Preferably, key input unit 11 is designed to alternatively generate a start signal and a stop signal whenever the erase start/stop key is pressed.

When reproduction of the video signal in the source tape is completed, the source tape is rewound, so that the capstan frequency pulse signal and data stored in memory 15 are matched during edit-recording. In step 200, an editing tape is inserted in recorder 10, and reproducer 10 and recorder 20 are in the reproduction mode and record mode, respectively. The video signal from reproducer 10 can be automatically edit-recorded on recorder 20 without the user's monitoring. An editing start key signal is detected in step 210, comparator 17 compares a respective pulse value output from counter 13 which counts a pulse signal supplied from capstan frequency generator 10 with overall pulse values stored in memory 15 in step 220. As a result of step 220, when a current pulse value output from counter 13 is in accord with the pulse value stored in memory 15, comparator 17 judges whether the stored data corresponding to the stored pulse value is equal to start data of an erase interval in step 230. If so, comparator 17 supplies a signal indicating the start of this erase interval to mode controller 18. Mode controller 18 outputs a signal that puts recorder 20 in a pause mode of recording (step 240). Signal recognizer 21 of recorder 20 receives the output signal from mode controller 18 and supplies it to mode designator 22. Mode designator 22 converts the operating mode of recorder 20 into a pause mode of recording.

With signals on the source tape continuously reproduced, comparator 17 applies to mode controller 18 a signal indicating the end of interval to be erased, when data on end of an erase interval stored in memory 15 is in accord with the output signal supplied from counter 13. Then, mode controller 18 outputs a signal that causes recorder 20 to enter a record mode (step 250). If signal recognizer 21 of recorder 20 recognizes this signal and applies it to mode designator 22, mode designator 22 designates the operating mode of recorder 20 from a pause mode of recording to a record mode. The above process is iterated until the end of the source tape (step 260).

As described above, the automatic editing apparatus of the video signal according to the present invention presets start and end positions of an erase interval, reproducing only desired signals on a source tape. The positions are stored in the memory using capstan frequency pulses. The apparatus compares data stored in memory during edit-recording with capstan frequency pulses during reproducing and erases a signal at the preset interval, thereby performing an editing process. Accordingly, the present invention has an effect that desirous scenes from the source tape are continuously edited. Particularly, since a camcorder and video cassette tape (VTR) of 8 mm format has no control signal such as that of a VHS type, the present invention provides better effect in an editing method of the video signal using the capstan frequency pulses.

While only certain embodiments of the invention have been specifically described herein, it will apparent that numerous modifications may be made thereto without departing from the spirit and scope of the invention.

What is claimed is:

1. An automatic editing apparatus of a video signal which records only desired signals, among signals recorded on a source tape, on an editing tape, the automatic editing apparatus comprising:

detection means for detecting position data of a picture reproduced during reproduction of the source tape, said detecting means detecting the position data independently of any information contained on said source tape;

setting/storing means for setting and storing a signal erase interval corresponding to at least a portion of said signals recorded on said source tape relative to a position value detected from said detection means during a first reproduction of said source tape;

recording means for recording signals reproduced from the source tape;

control means for comparing the position data detected from said detection means during a second reproduction of said source tape with the position value stored by said setting/storing means, and for outputting to said recording means a specific signal during a time period corresponding to the stored signal erase interval, said specific signal causing a recording operation of said recording means to pause while said specific signal is output to said recording means.

2. The automatic editing apparatus according to claim 1, wherein said position data is a pulse coefficient value of a capstan frequency generated while reproducing the source tape.

3. The automatic editing apparatus according to claim 1, wherein said signal erase interval is set and stored in said setting/storing means using key signals designating start and end positions of said signal erase interval.

4. An automatic editing method of a video signal which records only desired signals, among signals recorded on a source tape, on an editing tape, the automatic editing method comprising the steps of:

a) reproducing said signals recorded on said source tape;

b) detecting position data of a picture reproduced during reproduction of the source tape, said position data being detected independently of any information contained on said source tape;

c) presetting a specific interval corresponding to undesired signals recorded on said source tape relative to a value of said position data detected in said step b, while step a is being performed;

d) after performing step a, performing a second reproduction of the signals recorded on said source tape, omitting those signals which correspond to the specific interval; and e) storing the signals reproduced in step d on said editing tape.

5. The automatic editing method according to claim 4, further comprising the step of generating pulse values of a capstan frequency when signals of said source tape are reproduced.

6. The automatic editing method according to claim 5, wherein said specific interval is set by counting the pulse values of said capstan frequency and storing the pulse values of a start position of said specific interval and an end position of said specific interval.

7. The automatic editing method according to claim 6, wherein said start position and said end position are determined by respective key signals.

* * * * *